US010370205B1

(12) United States Patent
Friesen

(10) Patent No.: US 10,370,205 B1
(45) Date of Patent: Aug. 6, 2019

(54) PORTABLE CONVEYING APPARATUS FOR TRANSFERRING PARTICULATE MATERIAL

(71) Applicant: Hi-Crush Canada Inc., Houston, TX (US)

(72) Inventor: Henry Friesen, Winkler (CA)

(73) Assignee: Hi-Crush Canada Inc., Houston, TX (US)

( * ) Notice: Subject to any disclaimer, the term of this patent is extended or adjusted under 35 U.S.C. 154(b) by 0 days.

(21) Appl. No.: 15/916,825

(22) Filed: Mar. 9, 2018

(51) Int. Cl.
*B65G 69/18* (2006.01)
*B65G 47/44* (2006.01)
*B65G 21/08* (2006.01)
*B65G 47/18* (2006.01)
*B65G 41/00* (2006.01)
*B65G 67/20* (2006.01)

(52) U.S. Cl.
CPC .......... *B65G 69/181* (2013.01); *B65G 21/08* (2013.01); *B65G 41/006* (2013.01); *B65G 41/008* (2013.01); *B65G 47/18* (2013.01); *B65G 47/44* (2013.01); *B65G 67/20* (2013.01); *B65G 2201/045* (2013.01); *B65G 2207/40* (2013.01)

(58) Field of Classification Search
CPC .... B65G 21/08; B65G 41/006; B65G 41/007; B65G 41/008; B65G 47/18; B65G 47/19; B65G 47/20; B65G 47/44; B65G 67/04; B65G 67/06; B65G 67/20; B65G 69/12; B65G 69/181; B65G 69/183; B65G 2201/045; B65G 2207/40; B65D 88/30; B65D 88/546
See application file for complete search history.

(56) References Cited

U.S. PATENT DOCUMENTS

| 8,562,720 | B2 * | 10/2013 | Stutzman | B65D 85/68 55/356 |
| 8,636,832 | B2 * | 1/2014 | Stutzman | B01D 45/08 55/356 |
| 8,881,749 | B1 * | 11/2014 | Smith | E21B 43/267 134/104.2 |
| 9,845,210 | B2 * | 12/2017 | Oren | B65G 15/00 |
| 2016/0031658 | A1 * | 2/2016 | Oren | B65G 69/185 414/411 |

(Continued)

*Primary Examiner* — Gene O Crawford
*Assistant Examiner* — Keith R Campbell
(74) *Attorney, Agent, or Firm* — Baker Botts L.L.P.

(57) ABSTRACT

A portable conveying apparatus for transferring particulate material comprises a conveyor supported on a trailer frame and operable to convey the material for subsequent discharge to a target location. A housing mounted to the trailer frame and substantially covering a top of the conveyor defines at least one inlet for delivery of material from a container to the conveyor. A flexible chute communicating each inlet and a container discharge to guide the material to the apparatus housing is carried on the trailer frame in a storage position so as to be transportable therewith. Within the housing, an upper guide surface converges to a central grate disposed at a transversely offset location from the respective inlet for central depositing of the material onto the conveyor. A suspension arrangement is operable to raise and lower the trailer frame between transport and operating positions so that a bottom of the trailer frame can rest on the ground to inhibit the dust emanating during use.

19 Claims, 8 Drawing Sheets

(56) References Cited

U.S. PATENT DOCUMENTS

| | | | |
|---|---|---|---|
| 2016/0130095 A1* | 5/2016 | Oren | B65G 65/40 |
| | | | 414/414 |
| 2016/0280480 A1* | 9/2016 | Smith | B65G 69/186 |
| 2018/0065814 A1* | 3/2018 | Eiden, III | B65G 41/006 |

* cited by examiner

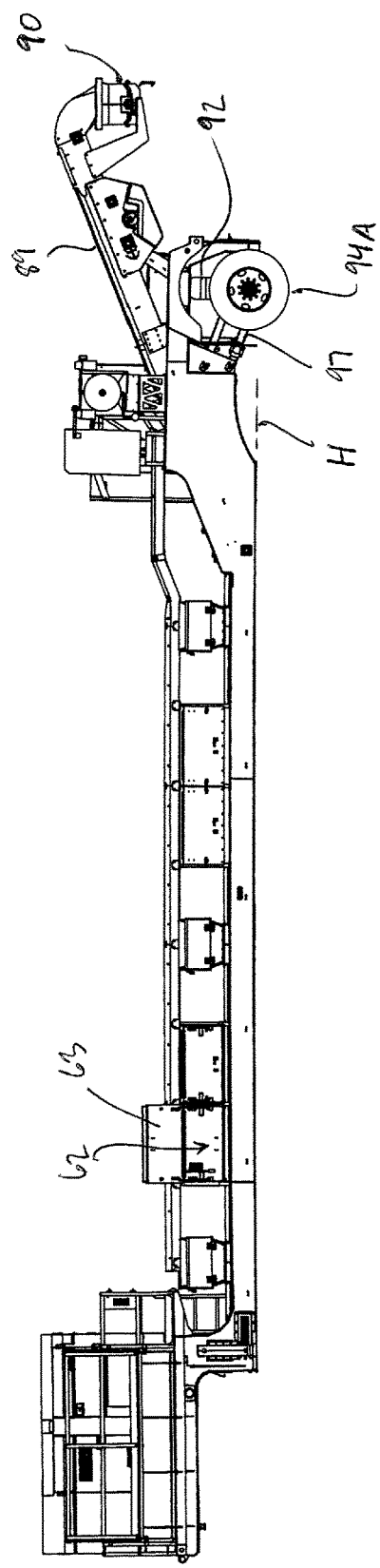

PORTABLE CONVEYING APPARATUS FOR TRANSFERRING PARTICULATE MATERIAL

FIELD OF THE INVENTION

The present invention relates generally to a portable conveying apparatus with a conveyor supported on a frame of the type which can be towed by a towing vehicle from one location to the next for transferring particulate material from a storage container to a receiving unit as for example in a hydraulic fracturing operation in which proppant in the form of fracturing sand is contained in transportable silos and is transferred to a blender, and more specifically to such a portable conveying apparatus which includes a storable flexible chute for removably connecting to a discharge of the storage container, a grate beneath an inlet of a conveyor housing for controlling deposit location of the material onto the conveyor, and a liftable and lower suspension arrangement which raises and lowers the trailer frame to dispose a bottom of the trailer frame in contact with the ground when in use transferring the material.

BACKGROUND

It is well known in the field of hydraulic fracturing operations that proppant in the form of fracturing sand emits dust which is hazardous to human health. As one example, fracturing sand contains silica to which exposure by the inhalation of silica dust can lead to a development of the disease silicosis.

In a hydraulic fracturing operation, one area thereof where dust emanation is prevalent is in transfer of the proppant from storage containers to the blender. Often, a number of such storage containers presently in the typical form of upstanding transportable silos are arranged in an array feeding to a common transfer conveyor which subsequently discharges the proppant to the blender where the proppant is mixed with other substances to be readied for further use in the fracturing operation. Human input in proximity of this equipment is still required for operation thereof and thus it is desirable to reduce dust exposure to human operators so as to provide a healthier working environment.

Attempts have been made to cover transfer points in the flow of proppant from storage container to main transfer conveyor to blender for example with simple canvas tarps, but these arrangements are relatively crude and do not provide adequate sealing and thus containment of dust at the transfer points.

SUMMARY OF THE INVENTION

According to an aspect of the invention there is provided a portable conveying apparatus for use at a site to transfer particulate material from a storage container to a target location, comprising:

a trailer frame having longitudinally spaced first and second ends, and transversely spaced first and second sides;

a hitch coupling mounted to the trailer frame for coupling to a towing vehicle;

a wheel and axle assembly coupled to the trailer frame such that the trailer is towable across a support surface by the towing vehicle;

a conveyor supported on the trailer frame and operable to convey the particulate material received from the storage container for subsequent discharge to the target location;

a housing mounted on the trailer frame and substantially covering a top of the conveyor to restrict dust emanating above the conveyor generated during transfer of the particulate material along the conveyor;

the housing defining at least one inlet through which the particulate material is delivered to the conveyor from an exterior of the housing;

a flexible chute communicated with each of said at least one inlet at one end of the chute;

a distal end of the chute being removably connectable to a discharge of the storage container in an operating position of the chute to form a path for guiding the particulate material from the storage container to the housing of the portable conveying apparatus;

the chute being carried on the trailer frame in a storage position of the chute in which the distal end of the chute is disconnected from the discharge of the storage container so that the chute is transportable with the trailer frame between sites.

Preferably, the chute is retractable to a retracted length suited for storage in the storage position and extendable from the retracted length to an operating length suited for bridging between a respective one of said at least one inlet and the discharge of the container in the operating position.

Preferably, the chute comprises corrugated tubing. In other words, the tubing is of a concertina type with multiple folds along its length forming alternating grooves and ridges allowing the chute to each be retractable in length by collapsing on itself.

Preferably, the apparatus further includes a chute storage enclosure mounted at each of said at least one inlet defined by the housing to define a space adjacent a respective one of said at least one inlet for receiving the chute in the storage position.

Preferably, the chute storage enclosure includes an openable cover disposed in spaced relation to a respective one of said at least one inlet surrounded by the chute storage enclosure, the cover being positionable in a closed position covering the respective one of said at least one inlet during transport and in an open position relative to the respective one of said at least one inlet in which distal end of the chute is removable from the space defined by the chute storage enclosure.

Preferably, the chute is affixed to the housing.

Typically, in the operating position the chute is inclined upwardly and transversely outwardly from the trailer frame.

Preferably, said at least one inlet comprises a plurality of inlets at transversely spaced positions of the trailer frame. Additionally, the inlets are typically disposed at longitudinally spaced positions of the trailer frame.

Preferably, the apparatus further includes within the housing an upper guide surface converging to a central grate which is below and transversely offset from each of said at least one inlet, and is disposed at a location vertically above the conveyor for depositing the particulate material centrally on the conveyor.

The grate may include a downwardly depending fin on an underside of the grate along a peripheral edge which is in transverse opposition to the respective one of said at least one inlet, the fin extending downwardly from the grate towards the conveyor to guide the particulate material downstream of the grate for central depositing onto the main conveyor portion.

Preferably, the housing spans from the first side of the trailer frame, above the conveyor, and transversely across the trailer frame, to the second side of the trailer frame. Thus, the housing more readily contains the dust emanating above the conveyor generated during movement of the particulate material along the conveyor.

Typically, a central portion of the trailer frame intermediate the wheel and axle assembly and a distal one of the first and second ends of the trailer frame being open at a bottom below the conveyor so as to define at least one bottom opening in the central portion of the trailer frame such the conveyor is substantially uncovered from the bottom of the central portion of the trailer frame.

Preferably, the apparatus further includes a liftable and lowerable suspension arrangement operably coupled between the trailer frame and the wheel and axle assembly to raise and lower the trailer frame relative to the wheel and axle assembly so that the wheel and axle assembly is positionable in an operating position in which the central portion of the trailer frame is lowered relative to the wheel and axle assembly so that a bottom of the central portion of the trailer frame is disposed in substantially a common plane with bottoms of wheels of the wheel and axle assembly a portion of the trailer frame defining said at least one bottom opening in the central portion of the frame is disposed in contact with the support surface therebeneath to substantially form a seal therewith to contain the dust emanating below the conveyor generated during transfer of the particulate material therealong.

According to another aspect of the invention there is provided a portable conveying apparatus for use at a site to transfer particulate material from a storage container to a target location, comprising:

a trailer frame having longitudinally spaced first and second ends, and transversely spaced first and second sides;

a hitch coupling mounted to the trailer frame for coupling to a towing vehicle;

a wheel and axle assembly coupled to the trailer frame such that the trailer is towable across a support surface by the towing vehicle;

a conveyor supported on the trailer frame and operable to convey the particulate material received from the storage container for subsequent discharge to the target location;

a housing mounted on the trailer frame and substantially covering a top of the conveyor to restrict dust emanating above the conveyor generated during transfer of the particulate material along the conveyor;

the housing defining at least one inlet through which the particulate material is delivered to the conveyor from an exterior of the housing;

an upper guide surface disposed within the housing above the conveyor and converging to a central grate;

the central grate being disposed in the upper guide surface at a location which is below and transversely offset from each of said at least one inlet, and which is vertically above the conveyor for depositing the particulate material centrally on the conveyor.

The particulate material is delivered from the storage containers into the housing at a considerable velocity and thus the upper guide surface converging to the grate allows for the particulate material to be controllably deposited at a central location on the conveyor.

Preferably, the upper surface on either side of the central grate is inclined upwardly and transversely outwardly from the grate to a respective one of the first and second sides of the trailer frame.

The grate may include a downwardly depending fin on an underside of the grate along a peripheral edge which is in transverse opposition to the respective one of said at least one inlet, the fin extending from the grate towards the conveyor to guide the particulate material downstream of the grate for depositing onto the main conveyor portion.

Preferably, the fin is generally planar in shape and oriented parallel to a direction of material transfer of the conveyor so as not to impede movement of the particulate material carried by the conveyor. Typically, the fin is oriented to lie in a plane which is normal to an upper surface of the conveyor.

According to another aspect of the invention there is provided a portable conveying apparatus for use at a site to transfer particulate material from a storage container to a target location, comprising:

a trailer frame having longitudinally spaced first and second ends, and transversely spaced first and second sides;

a hitch coupling mounted to the trailer frame for coupling to a towing vehicle;

a wheel and axle assembly coupled to the trailer frame such that the trailer is towable across a support surface by the towing vehicle;

a conveyor supported on the trailer frame and operable to convey the particulate material received from the storage container for subsequent discharge to the target location;

a housing mounted on the trailer frame and substantially covering a top of the conveyor to restrict dust emanating above the conveyor generated during transfer of the particulate material along the conveyor;

the housing defining at least one inlet through which the particulate material is delivered to the conveyor from an exterior of the housing;

a central portion of the trailer frame intermediate the wheel and axle assembly and a distal one of the first and second ends of the trailer frame being open at a bottom below the conveyor so as to define at least one bottom opening in the central portion of the trailer frame such the conveyor is substantially uncovered from the bottom of the central portion of the trailer frame; and a liftable and lowerable suspension arrangement operably coupled between the trailer frame and the wheel and axle assembly to raise and lower the trailer frame relative to the wheel and axle assembly;

the liftable and lowerable suspension arrangement being operable to position the wheel and axle assembly in a transport position in which the trailer frame is raised relative to the wheel and axle assembly with the bottom of the central portion of the trailer frame spaced at a height above bottoms of wheels of the wheel and axle assembly so as to be suited for towing across the support surface;

the liftable and lowerable suspension arrangement being operable to position the wheel and axle assembly in an operating position in which the trailer frame is lowered relative to the wheel and axle assembly so the bottom of the central portion of the trailer frame is disposed in substantially a common plane with the bottoms of the wheels so that in the operating position a portion of the trailer frame defining said at least one bottom opening in the central portion of the frame is disposed in contact with the support surface therebeneath to substantially form a seal therewith to restrict the dust emanating below the conveyor generated during transfer of the particulate material therealong.

Preferably, the housing spans from the first side of the trailer frame, above the conveyor, and transversely across the trailer frame, to the second side of the trailer frame. Thus, the housing more readily contains the dust emanating above the conveyor generated during movement of the particulate material along the conveyor such that the dust is substantially contained both above and below the conveyor.

Preferably, there is provided a dust containment wall on an underside of the trailer frame spanning between the first and second sides and from the bottom of the trailer frame towards an underside of the conveyor for contacting the support surface in the operating position of the wheel and axle assembly.

According to another aspect of the invention there is provided a portable conveying apparatus for transferring particulate material from a plurality of storage containers to a target location comprising:

a trailer frame having longitudinally spaced forward and rear ends, and laterally spaced first and second sides;

a hitch coupling mounted at the forward end of the trailer frame for coupling to a towing vehicle;

a wheel and axle assembly mounted at the rear end of the trailer frame such that the trailer is towable across a support surface by the towing vehicle;

a main conveyor portion supported on the trailer frame to be located laterally intermediate the first and second sides, and being oriented longitudinally of the trailer frame;

the main conveyor portion being operable to convey the particulate material received from the storage containers in a direction longitudinally of the trailer frame towards a rear of the main conveyor portion;

a discharge conveyor portion supported on the trailer frame rearwardly of the main conveyor portion;

the discharge conveyor portion being operable to receive the particulate material from the main conveyor portion and transfer the particulate material longitudinally of the trailer frame for discharge to the target location; a housing mounted on the trailer frame and covering a top of the main conveyor portion;

the housing spanning from the first side of the trailer frame, above the main conveyor portion and laterally across the trailer frame, to the second side of the trailer frame to contain dust emanating above the main conveyor portion generated during transfer of the particulate material therealong;

the discharge conveyor portion being enclosed to contain the dust generated during transfer of the particulate material therealong;

the housing that covers the main conveyor portion defining a plurality of inlets at longitudinally spaced positions of the main conveyor portion through which the particulate material is delivered to the main conveyor portion from an exterior of the housing;

a plurality of retractable flexible tubular conduits mounted in communication with the inlets;

a plurality of conduit storage enclosures respectively mounted at the inlets defined by the housing, each one of the conduit storage enclosures including an openable cover panel mounted in spaced relation to a respective one of the inlets surrounded by a respective one of the conduit storage enclosures to define a space between the respective one of the inlets and the cover panel disposed in a closed position covering the respective one of the inlets for receiving a respective one of the conduits in a retracted storage position;

the conduits each having a retracted length suited for storage in the respective one of the conduit storage enclosures in the retracted storage position and being extendable to an operating length exceeding a depth of the respective one of the conduit storage enclosures measured between the respective one of the inlets and the cover panel in the closed position;

the conduits each being removably connectable to a discharge of a respective one of the storage containers to form in the operating position a substantially enclosed passageway for guiding the particulate material from the respective one of the storage containers to the housing of the portable conveying apparatus;

whereby a flow of the particulate material from the storage containers to the target location is substantially enclosed so as to prevent the dust from emanating into ambient surroundings.

This arrangement provides good sealing at the transfer point defined between the storage containers storing the particulate material and the main conveyor portion receiving the particulate material therefrom. All components are carried on a transportable apparatus which can be moved from one location to the next.

In one arrangement, the conduits comprises corrugated tubing.

Preferably the apparatus includes gas bags operably coupled between the trailer frame and the wheel and axle assembly to raise and lower the trailer frame relative to the wheel and axle assembly so that the wheel and axle assembly is positionable in an operating position in which a central portion of the trailer frame intermediate the forward end and the wheel and axle assembly is lowered relative to the wheel and axle assembly so that a bottom of the central portion of the trailer frame which substantially defines a plane is disposed in substantially a common plane with bottoms of wheels of the wheel and axle assembly so that the bottom of the central portion of the trailer frame which is open between the first and second sides beneath the main conveyor portion is disposed in contact with the support surface therebeneath to substantially form a seal therewith to contain dust emanating below the main conveyor portion generated during transfer of the particulate material therealong.

Thus, the underside of the main conveyor portion can remain uncovered so as to reduce weight of the portable conveying apparatus by using less material therein, but the dust can still be suitably contained.

According to another aspect of the invention there is provided a portable conveying apparatus for transferring particulate material from a plurality of storage containers to a target location comprising:

a trailer frame having longitudinally spaced forward and rear ends, and laterally spaced first and second sides;

a hitch coupling mounted at the forward end of the trailer frame for coupling to a towing vehicle;

a wheel and axle assembly mounted at the rear end of the trailer frame such that the trailer is towable across a support surface by the towing vehicle;

a main conveyor portion supported on the trailer frame to be located laterally intermediate the first and second sides, and being oriented longitudinally of the trailer frame;

the main conveyor portion being operable to convey the particulate material received from the storage containers in a direction longitudinally of the trailer frame towards a rear of the main conveyor portion;

a discharge conveyor portion supported on the trailer frame rearwardly of the main conveyor portion;

the discharge conveyor portion being operable to receive the particulate material from the main conveyor portion and transfer the particulate material longitudinally of the trailer frame for discharge to the target location;

a housing mounted on the trailer frame and covering a top of the main conveyor portion;

the housing spanning from the first side of the trailer frame, above the main conveyor portion and laterally across the trailer frame, to the second side of the trailer frame to contain dust emanating above the main conveyor portion generated during transfer of the particulate material therealong;

the discharge conveyor portion being enclosed to contain the dust generated during transfer of the particulate material therealong;

the housing that covers the main conveyor portion defining a plurality of inlets at laterally spaced positions of the trailer frame through which the particulate material is delivered from an exterior of the housing on either the first side or the second side to the main conveyor portion;

a laterally opposite pair of the inlets being disposed above the main conveyor portion such that the particulate material delivered to the housing is enabled to flow substantially by gravity from the respective one of the inlets towards the main conveyor portion;

an upper surface spanning from the first side to the second side of the trailer frame at a location below the laterally opposite pair of the inlets but above the main conveyor portion to form a substantially enclosed compartment above the main conveyor portion that is collectively defined by the housing and the upper surface and communicable with an exterior of the portable conveying apparatus via the laterally opposite pair of the inlets;

a central grate disposed in the upper surface at a location vertically above the main conveyor portion and intermediate each one of the laterally opposite pair of the inlets;

whereby the particulate material received through the laterally opposite pair of the inlets is guided by the upper surface to the central grate for depositing centrally on the main conveyor portion.

Preferably, the upper surface on either side of the central grate is inclined upwardly and laterally outwardly from the grate to the respective one of the first and second sides of the trailer frame.

In one arrangement, the inlets each are located on one side of central longitudinal axis of the trailer frame and define an upright plane which is inclined upwardly and towards the central longitudinal axis of the trailer frame.

Preferably, the grate includes a downwardly depending fin on an underside of the grate along a lateral peripheral edge opposite to a respective one of the laterally opposite pair of the inlets thus extending downwardly from the grate towards the main conveyor portion to guide the particulate material passing through the grate for central depositing onto the main conveyor portion.

Preferably, the fin is generally planar in shape and oriented parallel to a direction of material transfer of the main conveyor portion so as not to impede movement of the particulate material carried by the main conveyor portion.

According to an aspect of the invention there is provided a portable conveying apparatus for transferring particulate material from a plurality of storage containers to a target location comprising:

a trailer frame having longitudinally spaced forward and rear ends, and laterally spaced first and second sides;

a hitch coupling mounted at the forward end of the trailer frame for coupling to a towing vehicle;

a wheel and axle assembly mounted at the rear end of the trailer frame such that the trailer is towable across a support surface by the towing vehicle;

a main conveyor portion supported on the trailer frame to be located laterally intermediate the first and second sides, and being oriented longitudinally of the trailer frame;

the main conveyor portion being operable to convey the particulate material received from the storage containers in a direction longitudinally of the trailer frame towards a rear of the main conveyor portion;

a discharge conveyor portion supported on the trailer frame rearwardly of the main conveyor portion;

the discharge conveyor portion being operable to receive the particulate material from the main conveyor portion and transfer the particulate material longitudinally of the trailer frame for discharge to the target location; a housing mounted on the trailer frame and covering a top of the main conveyor portion;

the housing spanning from the first side of the trailer frame, above the main conveyor portion and laterally across the trailer frame, to the second side of the trailer frame to contain dust emanating above the main conveyor portion generated during transfer of the particulate material therealong;

the discharge conveyor portion being enclosed to contain the dust generated during transfer of the particulate material therealong;

the housing that covers the main conveyor portion defining a plurality of inlets at longitudinally spaced positions of the main conveyor portion through which the particulate material is delivered to the main conveyor portion from an exterior of the housing;

a central portion of the trailer frame intermediate the forward end and the wheel and axle assembly being open at a bottom beneath the main conveyor portion between the first and seconds sides such the main conveyor portion is uncovered from the bottom of the central portion of the trailer frame;

the bottom of the central portion of the trailer frame substantially defining a bottom plane;

gas bags operably coupled between the wheel and axle assembly and the trailer frame to raise and lower the trailer frame relative to the wheel and axle assembly;

the gas bags being operable to position the wheel and axle assembly in a transport position in which the trailer frame is raised relative to the wheel and axle assembly with the bottom of the central portion of the trailer frame spaced at a height above bottoms of wheels of the wheel and axle assembly so as to be suited for towing across a support surface;

the gas bags being operable to position the wheel and axle assembly in an operating position in which the trailer frame is lowered relative to the wheel and axle assembly so that bottoms of the first and second sides at the central portion of the trailer frame lying in the bottom plane of the central portion of the trailer frame are disposed in substantially a common plane with the bottoms of the wheels so that in the operating position the bottoms of the first and second sides at the central portion of the trailer frame are disposed in contact with the support surface therebeneath to substantially form a seal between the bottom of the central portion of the trailer frame which is open and the support surface to contain dust emanating below the main conveyor portion generated during transfer of the particulate material therealong.

BRIEF DESCRIPTION OF THE DRAWINGS

The invention will now be described in conjunction with the accompanying drawings in which:

FIG. 5 is an enlarged partial view indicated at I in FIG. 1;

FIG. 9 is a side elevational view of the arrangement of FIG. 1 with the wheel and axle assembly thereof arranged in a transport position.

In the drawings like characters of reference indicate corresponding parts in the different figures.

DETAILED DESCRIPTION

The accompanying figures show a portable conveying apparatus 10 for transferring particulate material from a plurality of storage containers (not shown) to a target location. One example use of the apparatus 10 is in a hydraulic fracturing operation in which proppant in the form of fracturing sand is transferred from upstanding transportable silos positioned in an array to a blender receiving the proppant for mixing with other substances.

Figure 1:
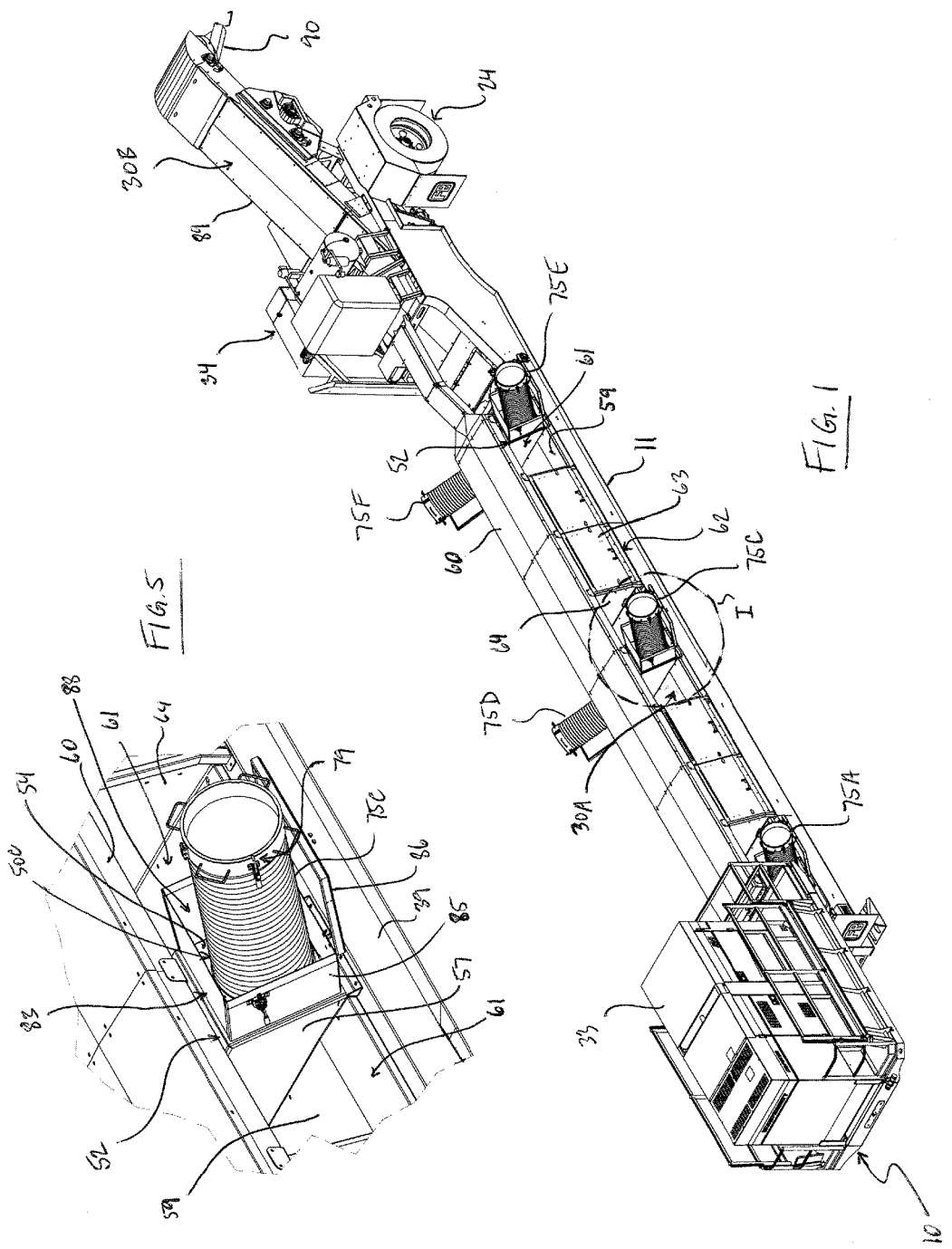
FIG. 1 is a perspective view of an arrangement of portable conveying apparatus according to the present invention.
Figure 2:
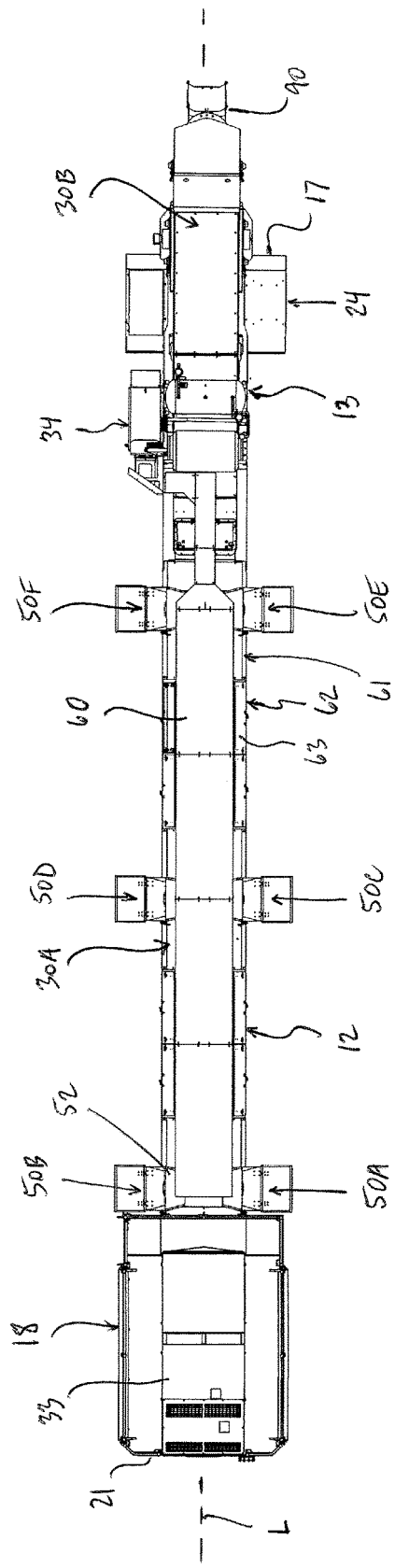
FIG. 2 is a top plan view of the arrangement of FIG. 1.
Figure 3:
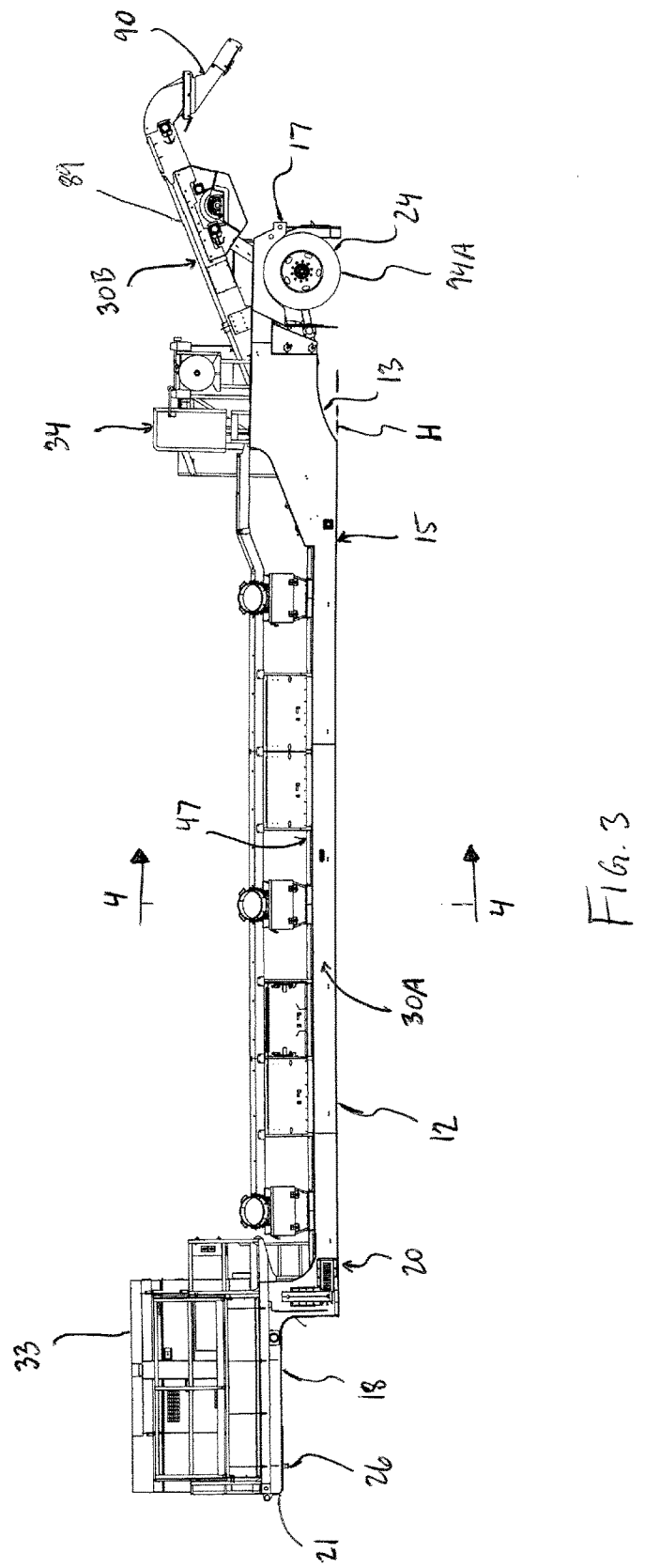
FIG. 3 is a side elevational view of the arrangement of FIG. 1 with a wheel and axle assembly thereof arranged in an operating position.

Referring to FIGS. 1-3, the portable conveying apparatus 10 comprises a trailer frame 11 of the type for towing on a highway by a highway tractor. The trailer frame has a center frame section 12, a rear frame section 13 coupled at a rear 15 of the center frame section 12 and defining a rear end 17 of the trailer frame, and a forward frame section 18 coupled at a front 20 of the center frame section and defining a forward end 21 of the trailer frame. The center frame section 12 is lowered relative to both the forward frame section 18 and the rear frame section 13.

A wheel and axle assembly 24 is mounted to the rear frame section 13 to support the apparatus 10 in movement across a support surface, and a hitch coupling in the form of a downwardly depending king pin 26 is mounted to an underside of the forward frame section 18 so that the trailer frame can be coupled to a towing vehicle for transport of the apparatus 10 from one location to the next.

Figure 4:
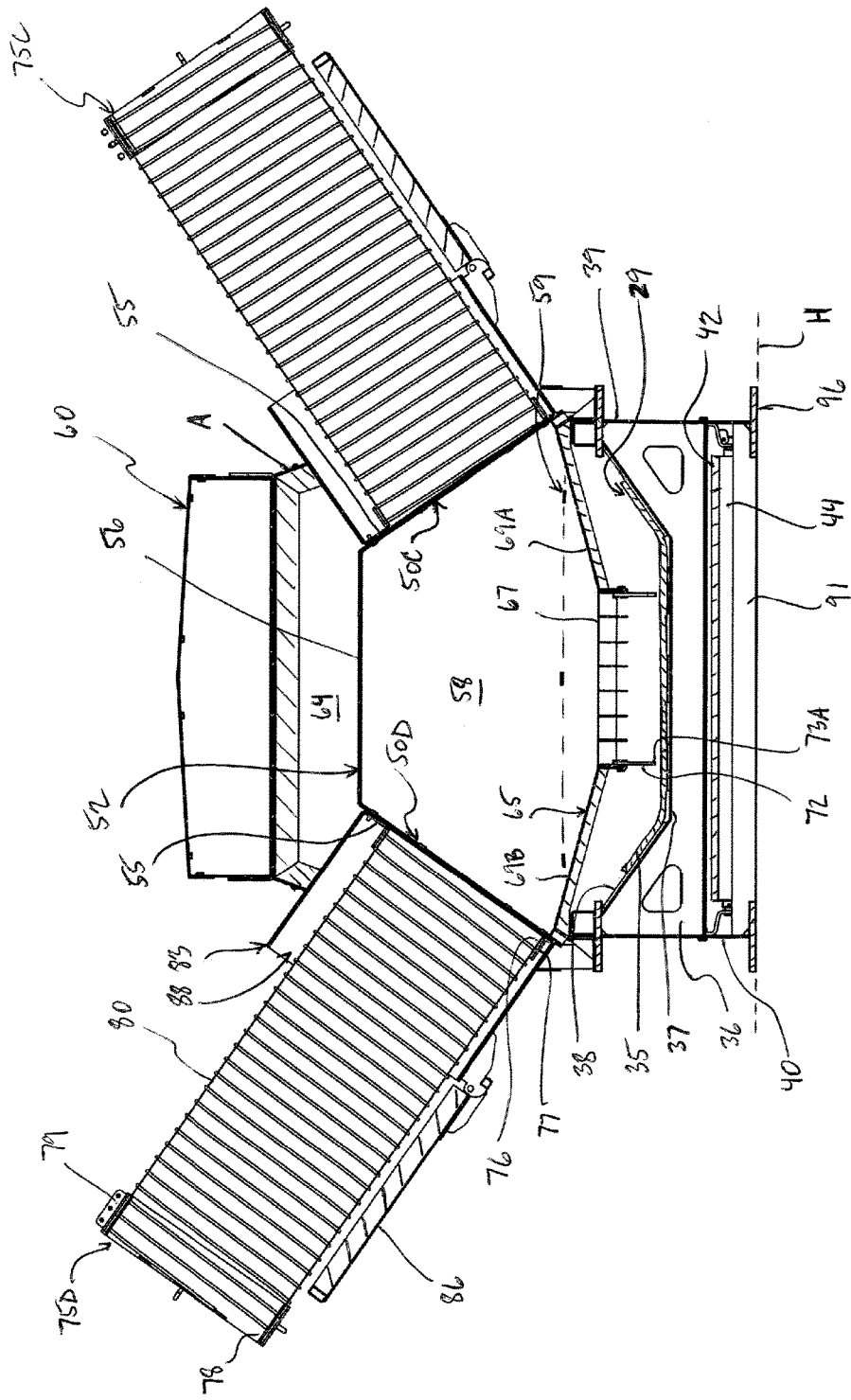
FIG. 4 is a cross-sectional view along line 4-4 in FIG. 3.
Figure 6:
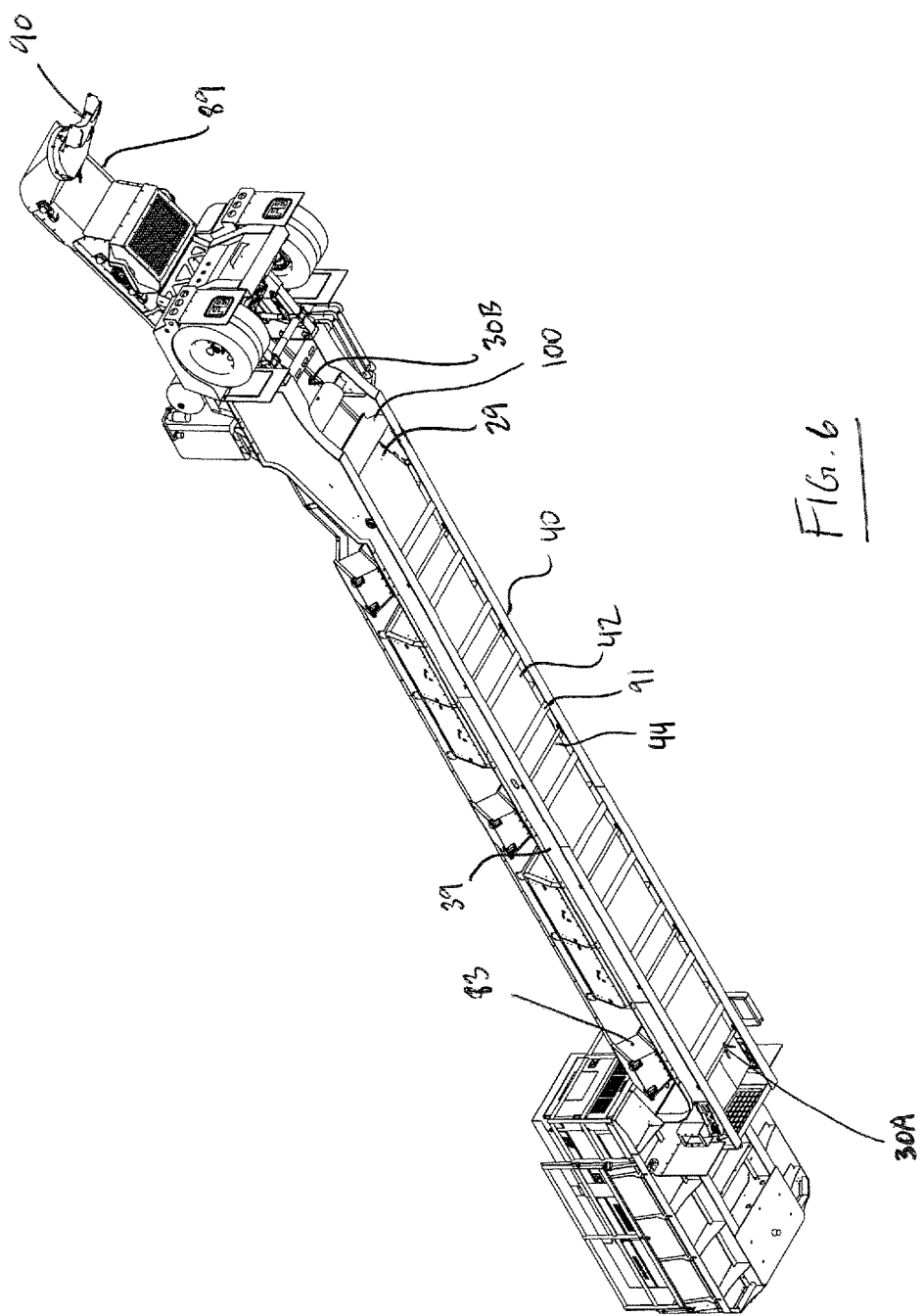
FIG. 6 is a perspective view showing a bottom of the arrangement of FIG. 1.

Referring now to FIG. 4, the portable conveyor apparatus 10 further includes a belt conveyor 29 mounted to the trailer frame 11 and oriented longitudinally thereof so as to be operable to convey particulate material longitudinally of the trailer frame. The belt conveyor 29 comprises a main conveyor portion 30A disposed along the center frame section 12 and an inclined discharge conveyor portion 30B disposed along the rear frame section rearwardly of the main conveyor portion, the latter of which is more clearly shown in FIG. 3. The main conveyor portion 30A is operable to convey the particulate material received from the storage containers in a direction longitudinally of the trailer frame 11 towards a rear of the main conveyor portion 30A, and the discharge conveyor portion 30B is operable to receive the particulate material from the main conveyor portion 30A and transfer the particulate material longitudinally of the trailer frame for discharge to the target location. In the illustrated arrangement, the belt conveyor 29 comprises a continuous length of conveyor belt forming both the main conveyor portion 30A and the discharge conveyor portion 30B; however, in other arrangements, these two portions may each be formed by a distinct conveyor belt.

A power pack 33 including generators is carried on the forward frame section 18 of the trailer frame and is operably coupled to motors 34 for operating the belt conveyor 29 and pumps of a suspension coupled to the wheel and axle assembly 24 are located.

As more clearly shown in FIG. 4, an upper run 35 of the main conveyor portion 30A which receives and conveys the particulate material is supported by the center frame section 12 on laterally oriented support brackets 36 with generally concave upper surfaces 37 extending between left side and right side longitudinally extending I-beams 39, 40 defining laterally transverse opposite sides of the center frame section 12. The generally concave upper surfaces 37 of the upper run support brackets 36 carry ultra-high-molecular-weight polyethylene plastic guide strips 38 along which an underside of the upper run 35 slides in rotation of the conveyor belt 29 about its end rollers (not shown).

A lower run 42 of the main conveyor portion is supported on top of laterally oriented rollers 44 mounted between the longitudinal I-beams 39, 40 at a spaced location below the upper run support brackets 36. Thus the main conveyor portion 30A is located laterally between opposite left and right sides of the center frame section 12, and both the upper and lower runs 35, 42 of the main conveyor portion 30A are located at a height between tops and bottoms of the longitudinal I-beams 39 and 40, such that the main conveyor portion 30A is oriented generally parallel to the longitudinal extent of the center frame section 12 and is located within a circumferential periphery delimited by the center frame section 12.

The portable conveying apparatus 10 further includes a housing 47 which is mounted to the center frame section 12 of the trailer frame and covers a top of the main conveyor portion 30A. More specifically, the housing 47 spans from the first side of the trailer frame defined by the longitudinal I-beam 39, above the upper run 35 of the main conveyor portion 30A and laterally across the center frame section 12 of the trailer frame, to the second side of the trailer frame defined by the other longitudinal I-beam 40.

The housing 47 defines a plurality of inlets 50A-F at longitudinally and laterally spaced positions with respect to the center frame section 12, through which the particulate material is delivered to the upper run 35 of the main conveyor portion 30A from an exterior of the housing 47 on either side of the apparatus 10 where the storage containers are located. More specifically, the inlets 50A-F are defined at raised portions 52 of the housing respectively forming a compartment over a portion of the upper run 35 of the main conveyor portion and including a laterally opposite pair of the inlets such as 50A-B. The raised portions 52 include inclined end walls 54, 55 each facing outwardly to one side of the trailer frame 11 and locating one of the laterally opposite pair of inlets such as 50C or 50D, a top wall 56 bridging between the end walls 54, 55, and a pair of parallel side walls 57, 58 respectively longitudinally spaced apart relative to the center frame section 12 and spanning laterally across same. Each of the end walls 54, 55 is planar so as to define an upright plane, and is inclined upwardly and inwardly towards a central longitudinal axis L of the trailer frame, which is shown more clearly in FIG. 2, such that the respective raised portion 52 of the housing tapers in width measured in a lateral direction from one side of the center frame section 12 to the other towards from a bottom to a top of the raised portion 52.

For the remaining portions of the length of the housing 47 in front and to the rear of each one of the raised portions 52, the housing 47 comprises a lowered covering wall 59 which bridges from one side of the center frame section to the other side at a location closer to the upper run 35 than is the top wall 56 of the raised portion to enclose the center frame section above the upper run 35 of the main conveyor portion 30A.

A circumferentially enclosed tray 60 which is elongated in the longitudinal direction of the trailer frame 11 spans the full length of the center frame section 12 and substantially bridges the forward frame section 18 and the rear frame sections 13 at a spaced height above the top wall 56 of the raised portions 52 and the lowered covering wall 59 to carry wiring/lines from the power pack 33 at the front of the apparatus towards the rear of the trailer frame 11 where the motors 34 for operating the belt conveyor 29 and pumps of a suspension coupled to the wheel and axle assembly 24 are located. Thus a support arch A is provided at the raised portions to support the tray 60 thereover, as more clearly shown in FIG. 4.

Adjacent each one of the raised portions 52 of the housing is thus formed a thru-opening 61 which is open at both sides of the center frame section 12 but is capped at the top by the tray 59.

Additionally, there are provided equipment storage compartments 62 mounted on top of the housing 47 at locations adjacent each thru-opening 61. The storage compartments 62 have a pair of openable doors 63 disposed at laterally opposite sides of the compartments 62 and a pair of side walls 64 to enclose the storage portions 62 in the lateral direction from one side of the center frame section 12 to the other side.

Thus the housing 47 forms an upper shell above the main conveyor portion 30A which acts to contain dust emanating from the particulate material above the main conveyor portion 30A as the particulate material is moved thereby along the apparatus 10.

Within the shell formed above the main conveyor portion 30A by the respective raised portion 52 of the housing 47, which locates each laterally opposite pair of inlets such as 50C-D through which the material passes from the storage containers to the main conveyor portion 30A, as shown in FIG. 4 there is provided an interior upper guide surface 65 which acts to guide the material before it deposits onto the upper run 35 of the main conveyor portion 30A. The guide surface 65 spans from one side of the center frame section 12 to the opposite side at a location below the laterally opposite pair of inlets such as 50C-D but above the upper run 35 of the main conveyor portion 30A so as to form a substantially enclosed compartment above the main conveyor portion which is communicable with the exterior of the housing 47 via the inlets 50C-D. Laterally centrally of the upper surface 65 is provided a central grate 67 which is disposed at a location vertically above the upper run 35 of the main conveyor portion 30A and located centrally relative to a width thereof in the lateral direction so as to be disposed at a laterally offset location from each one of the laterally opposite pair of the inlets 50C-D. Thus the compartment collectively formed by the raised portion 52 of the housing and the upper surface 65 is communicable with a substantially closed space immediately vertically above the upper run 35 of the main conveyor portion for depositing the particulate material received through the laterally opposite pair of inlets centrally onto the upper run 35 of the main conveyor portion 30A.

The upper guide surface 65 comprises opposite cooperating downwardly sloping portions 69A and 69B on either side of the central grate 67 each of which defines a plane which is inclined upwardly and laterally outwardly from the central grate to the respective one of the sides of the center frame section 12. Thus the opposite sloping portions 69A, 69B of the upper guide surface 65 act to funnel the particulate material towards the central grate 67 to which the upper guide surface 65 converges that is located at the lowest point of the compartment.

The central grate 67 includes a downwardly depending fin 72 located at each lateral peripheral edge of the grate on an underside of the grate 67 and extending downwardly from the grate towards an upper surface of the upper run 35 of the main conveyor portion but terminating at a spaced location thereabove at a free bottom edge 73A of the fin. Thus each fin 72 is disposed in lateral opposition to one of the laterally opposite inlets 50C or 50D of the respective raised portion 52 of the housing so as to act as a vertical guide surface downstream of the grate (relative to the path of material flow through the inlets to the main conveyor portion) for the inlet in lateral opposition to the corresponding fin 72 to further aid the central depositing of the particulate material onto the upper run 35. The fins 72 are planar in shape and oriented normal to the upper surface of the upper run 35 and parallel to the direction in which the upper run 35 of the main conveyor portion 30A conveys material so that the fins, which are thin strips of rubber which is resilient, do not impede the movement of particulate material which is carried on the upper run 35 past the fins 72 and the grate 67 to which they are coupled to cooperate with.

In order to guide the particulate material into each one of the inlets 50A-F defined by the housing 47 for subsequent depositing onto and conveyance by the main conveyor portion 30A, the apparatus 10 includes a plurality of retractable flexible corrugated tubular conduits 75A-F defining circumferentially enclosed chutes mounted in communication with the inlets 50A-F so as to form a circumferentially enclosed passageway from discharges of the storage containers to the housing 47. At a base end 76 of each corrugated conduit there is provided an annular flange 77 which interconnects the respective conduit with the respective end wall 54, 55 of the raised portion 52 of the housing, and forms a seal therebetween. A distal end 78 of the respective conduit carries a connection mechanism 79 in the form of a latch which removably couples to the discharge of the respective storage container and forms a seal therebetween by an annular gasket carried by the respective conduit at or adjacent its distal end 78 (not shown). In use, the distal end 78 of the respective conduit is brought to touch with the discharge of the respective storage container, and the latch is mated with a corresponding cooperating component supported on the container discharge, and upon mating a substantially airtight seal is formed between the container discharge and the conduit so that dust emanating from the particulate material during transfer out of the storage container is contained within the enclosed passageway formed between the portable conveying apparatus housing 47 and the storage container.

The conduits are flexible such that a tubular body 80 of the respective conduit can follow a requisite path between distal and base ends 78, 76 in the event that the discharges of the storage container are not in axial alignment with the corresponding one of the housing inlets 50A-F. The body 80 of each conduit is made from a transparent or, at the least, translucent plastic material so that an interior of the respective conduit is substantially visible from an outside thereof in order to ascertain presence of material in the conduit and movement thereof from storage container to the housing, as otherwise the pathway therefor is circumferentially enclosed from storage container discharge to the housing.

Each conduit 75A-F is affixed to the housing 47 so as to be carried by the apparatus 10 and transportable with the trailer frame 11 from one site to the next. Thus each conduit such as 75C is retractable in length by collapsing on itself to a retracted length suited for storage when the apparatus 10 is being transported between sites and is extendable to an operating length suited for bridging a distance between the discharge of the respective storage container and the corresponding housing inlet. Since the conduits are corrugated they have substantially uniform cross-sectional size along the full length of the respective conduit while remaining retractable to a minimum length suited for storage purposes. Further, the apparatus 10 includes a plurality of conduit storage enclosures 83 respectively mounted at the end walls 54, 55 of the raised housing portions 52 locating the inlets 50A-F for containing each one of the conduits 75A-F during transport.

As shown more clearly in FIGS. 4 and 5, each one of the conduit storage enclosures 83 includes a peripheral wall 85 encompassing the corresponding inlet, such as 50C which is shown in FIG. 5, and an openable cover panel 86 hingedly mounted in spaced relation to the corresponding inlet for movement relative thereto between a closed position in which the panel 86 spans across the opening formed by the peripheral wall 85 and conceals the inlet, and an open position in which the conduit for example 75C mounted at that inlet can be substantially removed from containment in the enclosure 83 for subsequent connection to the discharge of a storage container. The storage enclosures 83 each define a space 88 between the corresponding one of the inlets and the cover panel 86 arranged in the closed position spanning across the end of the peripheral wall 85 which is distal to the inlet, which is sized sufficiently large in a depth direction between the panel 86 in the closed position and the end wall such as 54 locating the inlet in order to receive the respective conduit in a retracted storage position in which the conduit 75C is not connected to the container discharge and is retracted to a minimum length which is substantially equal to or less than the depth of the storage enclosure. Of course, the conduits 75A-F are each extendable to an operating length exceeding the depth of the respective conduit storage enclosure 83 so as to bridge the full distance between the inlet and the storage container discharge that is to be communicated therewith.

As is known in the art, movement or flow of particulate material generates dust which depending on the constituent material can be hazardous to humans if inhaled. In the example of hydraulic fracturing operations which is used herein, fracturing sand comprises silica and inhalation of the dust which emanates during transfer of the proppant is known to lead to the disease silicosis. As such, the portable conveying apparatus 10 is configured to contain the dust emanating from the material during transfer of same, and thus the conduits 75A-F form an enclosed passageway for containing the dust emanating from the particulate material as it moves from the storage containers to a material transfer device of the portable conveyor apparatus, and the housing 47 of the apparatus 10 is configured to contain the dust emanating above the main conveyor portion 30A generated during transfer of the particulate material therealong.

Additionally, the inclined discharge conveyor portion 30B is circumferentially enclosed by a discharge conveyor housing 89 extending along the discharge conveyor portion from in between the laterally opposite sides of the rear frame section 13 and above the rear frame section. A terminal end of the discharge conveyor housing is shaped into the form of a funnel which opens only at a bottom outlet through which the particulate material discharging from the discharge conveyor portion 30B passes by gravity towards the target location. A rotatable chute 90 is coupled to the housing 89 to direct the particulate material by gravity to the target location. The chute 90 is movable in rotational motion relative to the discharge outlet which defines an upstanding rotational axis of the chute's motion.

Even though the main conveyor portion 30A is covered from a top, it is uncovered from the bottom as the center frame section 12 of the trailer frame is open at a bottom beneath the lower run 42 of the main conveyor portion 30A between the opposite longitudinal I-beams 39, 40. There are a plurality of lateral cross-members 91 spanning across the full width of the center frame section 12 and arranged at longitudinally spaced locations at the bottom of the center frame section, with bottoms thereof flush with bottoms of the I-beams 39, 40; however, these are not sufficiently wide to collectively form a cover panel beneath the lower run 42 of the main conveyor portion and thus the center frame section 12 remains substantially open at the bottom thereof. This reduces weight of the apparatus 10. Thus there is defined in the bottom of the center frame section 12 at least one bottom opening, where in the illustrated arrangement this (that is, the at least one opening) is generally delimited by inner sides of the longitudinal I-beams 39, 40 and the front and rear of the center frame section, or alternatively there are a plurality of openings each separated from the adjacent for example by the respective cross member 91.

Thus, in order to fully circumferentially enclose the main conveyor portion 30A during operation of the apparatus 10, opposite sides delimiting the open bottom of the center frame section 12 are brought to touch with the support surface beneath the apparatus 10 to substantially form a seal between the center frame section 12 and the support surface to contain the dust emanating below main conveyor portion 30A during transfer of the particulate material therealong.

To bring the bottom of the center frame section 12 to touch with the support surface, the illustrated arrangement of the apparatus 10 comprises gas bags 92 acting as a liftable and lowerable suspension arrangement, which are operably coupled between an axle 93 rotatably supporting wheels 94 of the wheel and axle assembly 24 and the rear frame section 13 to raise and lower the trailer frame 11 relative to the wheel and axle assembly 24. The gas bags 92 thus form a suspension carrying the wheel and axle assembly 24.

The axle 93 is connected to the trailer frame 11 by a pivotal connection formed between struts 97, which ends distal to the axle are pivotally coupled to the rear frame section 13 define a pivot axis P relative to which the axle 93 moves in upward and downward movement by operation of the gas bags 92.

The gas bags 92 are operable to position the wheel and axle assembly 24 in a transport position (or transport height) as shown in FIG. 9, in which the trailer frame 11 at the rear frame section 13 is raised relative to the wheel and axle assembly 24 with the bottom of the central frame section 12 spaced at a height above bottoms 94A of the wheels 94 so as to be suited for towing across the support surface. In other words, in the transport position the wheel and axle assembly 24 which remains in contact with a support surface at all times (via the wheels 94) is lowered relative to the trailer frame 11 so as to increase a spacing therebetween thereby raising the trailer frame 11 relative to the support surface.

Further, the gas bags 92 are operable to position the wheel and axle assembly 24 in an operating position (or operating height) as shown more clearly in FIG. 3, in which the trailer frame 11 is lowered relative to the wheel and axle assembly 24 so that bottom surfaces 96 of the left and right side longitudinal I-beams 39, 40 at the central frame section 12, which define a horizontal plane H across the bottom of the center frame section, are disposed in substantially a common plane with the bottoms 94A of the wheels 94. Thus in the operating position the bottoms 96 of the first and second sides of the central frame section 12, which define that portion of the center frame section delimiting the at least one bottom opening thereof, are disposed in contact with the support surface therebeneath, and as such a seal is substantially formed between the bottom of the central portion of the trailer frame which is open and the support surface to contain dust emanating below the main conveyor portion generated during transfer of the particulate material therealong.

Thus, the underside of the main conveyor portion can remain uncovered so as to reduce weight of the portable conveying apparatus by using less material therein, but the dust can still be suitably contained.

Figure 7:
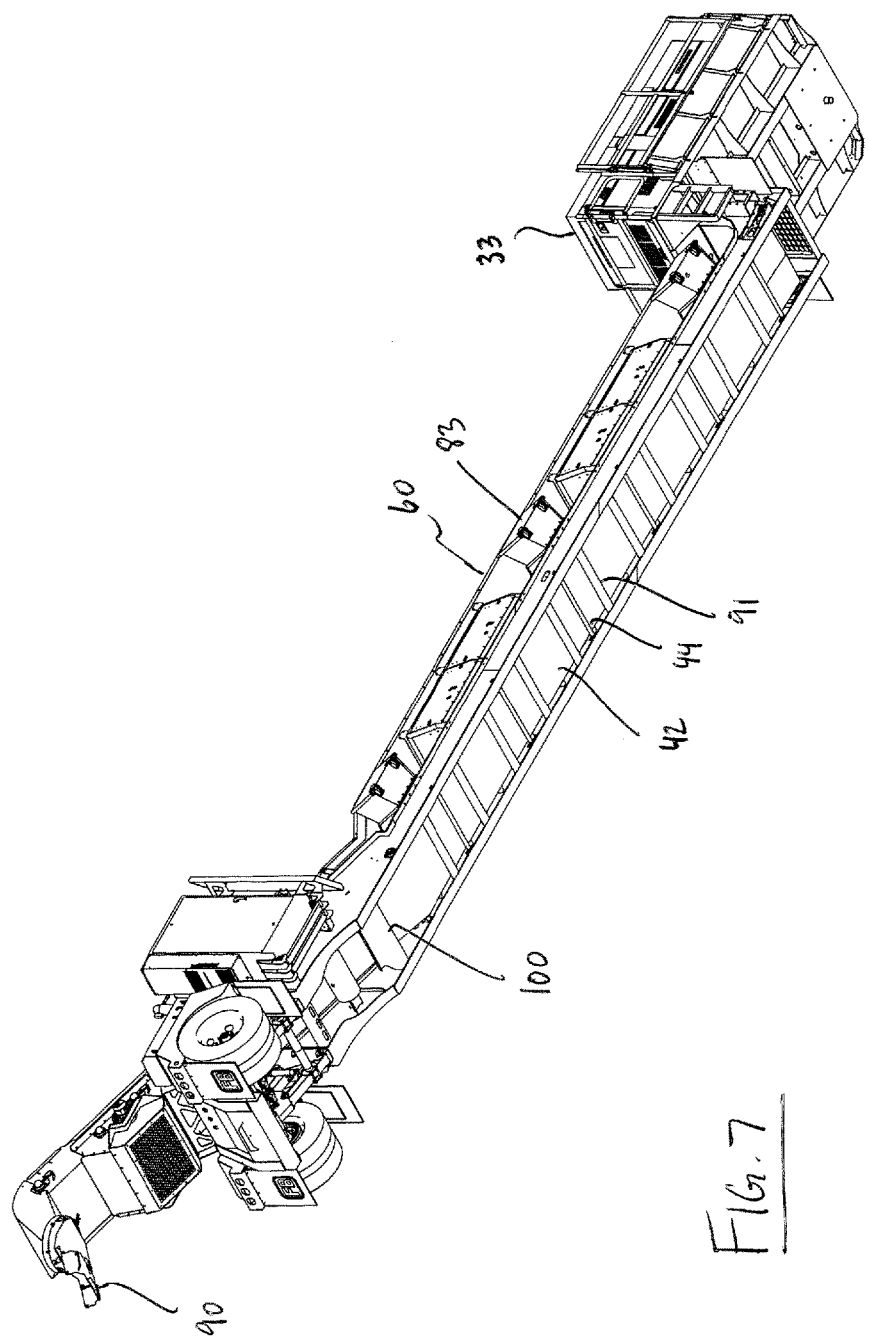
FIG. 7 is another perspective view similar to FIG. 6 but from the opposite side of the arrangement of FIG. 1.
Figure 8:
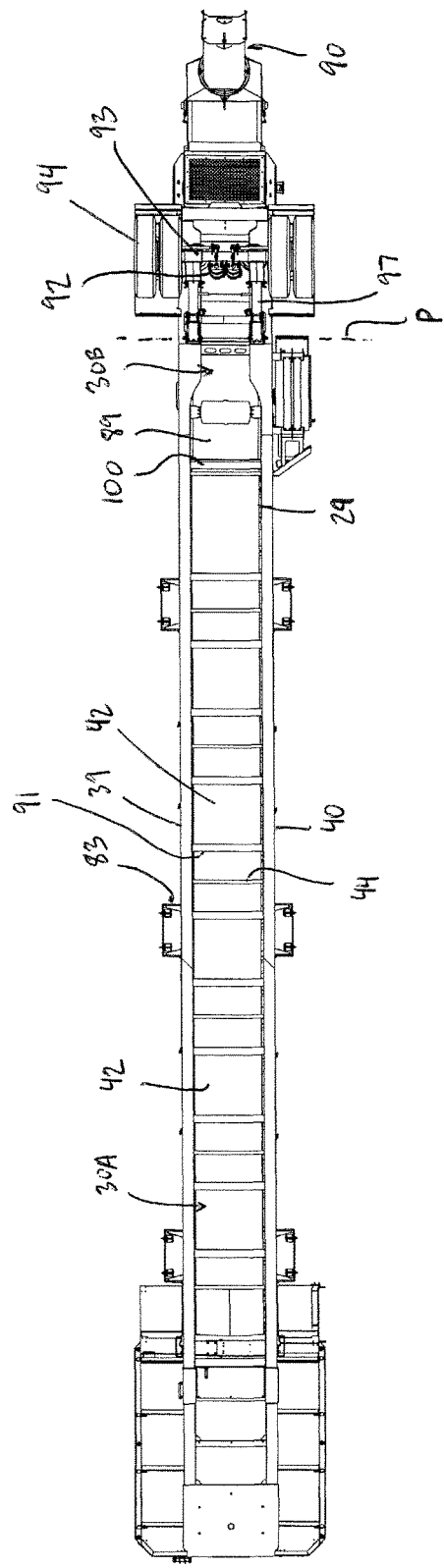
FIG. 8 is a bottom plan view of the arrangement of FIG. 1.

Further, as more clearly shown in FIGS. 7 and 8, where the discharge conveyor housing 89 commences on an underside of the discharge conveyor portion 30B there is a provided a laterally extending and upstanding dust containment wall 100 which spans from the housing 89 downwardly to the bottom of the trailer frame 11 and between the laterally opposite first and second sides of the trailer frame to enclose the center frame section rearwardly thereof when the wheel and axle assembly 24 is arranged in the operating position by presenting a bottom surface for contacting the support surface at the operating height.

The scope of the claims should not be limited by the preferred embodiments set forth in the examples but should be given the broadest interpretation consistent with the specification as a whole.

The invention claimed is:

1. A portable conveying apparatus for use at a site to transfer particulate material from a storage container to a target location, comprising:
   a trailer frame having longitudinally spaced first and second ends, and transversely spaced first and second sides;
   a hitch coupling mounted to the trailer frame for coupling to a towing vehicle;
   a wheel and axle assembly coupled to the trailer frame such that the trailer is towable across a support surface by the towing vehicle;
   a conveyor supported on the trailer frame and operable to convey the particulate material received from the storage container for subsequent discharge to the target location;
   a housing mounted on the trailer frame and substantially covering a top of the conveyor to restrict dust emanating above the conveyor generated during transfer of the particulate material along the conveyor;
   the housing defining at least one inlet through which the particulate material is delivered to the conveyor from an exterior of the housing;
   a flexible chute communicated with each of said at least one inlet at one end of the chute;
   a distal end of the chute being removably connectable to a discharge of the storage container in an operating position of the chute to form a path for guiding the particulate material from the storage container to the housing of the portable conveying apparatus;
   the chute being carried on the trailer frame in a storage position of the chute in which the distal end of the chute is disconnected from the discharge of the storage container so that the chute is transportable with the trailer frame between sites.

2. The portable conveying apparatus of claim 1 wherein the chute is retractable to a retracted length suited for storage in the storage position and extendable from the retracted length to an operating length suited for bridging between a respective one of said at least one inlet and the discharge of the container in the operating position.

3. The portable conveying apparatus of claim 1 wherein the chute comprises corrugated tubing.

4. The portable conveying apparatus of claim 1 further including a chute storage enclosure mounted at each of said at least one inlet defined by the housing to define a space adjacent a respective one of said at least one inlet for receiving the chute in the storage position.

5. The portable conveying apparatus of claim 4 wherein the chute storage enclosure includes an openable cover disposed in spaced relation to a respective one of said at least one inlet surrounded by the chute storage enclosure, the cover being positionable in a closed position covering the respective one of said at least one inlet during transport and in an open position relative to the respective one of said at least one inlet in which distal end of the chute is removable from the space defined by the chute storage enclosure.

6. The portable conveying apparatus of claim 1 wherein the chute is affixed to the housing.

7. The portable conveying apparatus of claim 1 wherein in the operating position the chute is inclined upwardly and transversely outwardly from the trailer frame.

8. The portable conveying apparatus of claim 1 wherein said at least one inlet comprises a plurality of inlets at transversely spaced positions of the trailer frame.

9. The portable conveying apparatus of claim 1 further including within the housing an upper guide surface converging to a central grate which is below and transversely offset from each of said at least one inlet, and is disposed at a location vertically above the conveyor for depositing the particulate material centrally on the conveyor.

10. The portable conveying apparatus of claim 9 wherein the grate includes a downwardly depending fin on an underside of the grate along a peripheral edge which is in transverse opposition to the respective one of said at least one inlet, the fin extending downwardly from the grate towards the conveyor to guide the particulate material downstream of the grate for central depositing onto the main conveyor portion.

11. The portable conveying apparatus of claim 1 wherein the housing spans from the first side of the trailer frame, above the conveyor, and transversely across the trailer frame, to the second side of the trailer frame.

12. The portable conveying apparatus of claim 11 wherein:
   a central portion of the trailer frame intermediate the wheel and axle assembly and a distal one of the first and second ends of the trailer frame being open at a bottom below the conveyor so as to define at least one bottom opening in the central portion of the trailer frame such the conveyor is substantially uncovered from the bottom of the central portion of the trailer frame; and
   there is provided a liftable and lowerable suspension arrangement operably coupled between the trailer frame and the wheel and axle assembly to raise and lower the trailer frame relative to the wheel and axle assembly so that the wheel and axle assembly is positionable in an operating position in which the central portion of the trailer frame is lowered relative to the wheel and axle assembly so that a bottom of the central portion of the trailer frame is disposed in substantially a common plane with bottoms of wheels of the wheel and axle assembly a portion of the trailer frame defining said at least one bottom opening in the central portion of the frame is disposed in contact with the support surface therebeneath to substantially form a seal therewith to contain the dust emanating below the conveyor generated during transfer of the particulate material therealong.

13. A portable conveying apparatus for use at a site to transfer particulate material from a storage container to a target location, comprising:
   a trailer frame having longitudinally spaced first and second ends, and transversely spaced first and second sides;
   a hitch coupling mounted to the trailer frame for coupling to a towing vehicle;
   a wheel and axle assembly coupled to the trailer frame such that the trailer is towable across a support surface by the towing vehicle;
   a conveyor supported on the trailer frame and operable to convey the particulate material received from the storage container for subsequent discharge to the target location;
   a housing mounted on the trailer frame and substantially covering a top of the conveyor to restrict dust emanating above the conveyor generated during transfer of the particulate material along the conveyor;
   the housing defining at least one inlet through which the particulate material is delivered to the conveyor from an exterior of the housing;
   an upper guide surface disposed within the housing above the conveyor and converging to a central grate;
   the central grate being disposed in the upper guide surface at a location which is below and transversely offset from each of said at least one inlet, and which is vertically above the conveyor for depositing the particulate material centrally on the conveyor.

14. The portable conveying apparatus of claim 13 wherein the upper surface on either side of the central grate is inclined upwardly and transversely outwardly from the grate to a respective one of the first and second sides of the trailer frame.

15. The portable conveying apparatus of claim 13 wherein the grate includes a downwardly depending fin on an underside of the grate along a peripheral edge which is in transverse opposition to the respective one of said at least one inlet, the fin extending from the grate towards the conveyor to guide the particulate material downstream of the grate for depositing onto the main conveyor portion.

16. The portable conveying apparatus of claim 15 wherein the fin is generally planar in shape and oriented parallel to a direction of material transfer of the conveyor so as not to impede movement of the particulate material carried by the conveyor.

17. A portable conveying apparatus for use at a site to transfer particulate material from a storage container to a target location, comprising:
   a trailer frame having longitudinally spaced first and second ends, and transversely spaced first and second sides;
   a hitch coupling mounted to the trailer frame for coupling to a towing vehicle;
   a wheel and axle assembly coupled to the trailer frame such that the trailer is towable across a support surface by the towing vehicle;
   a conveyor supported on the trailer frame and operable to convey the particulate material received from the storage container for subsequent discharge to the target location;
   a housing mounted on the trailer frame and substantially covering a top of the conveyor to restrict dust emanating above the conveyor generated during transfer of the particulate material along the conveyor;
   the housing defining at least one inlet through which the particulate material is delivered to the conveyor from an exterior of the housing;
   a central portion of the trailer frame intermediate the wheel and axle assembly and a distal one of the first and second ends of the trailer frame being open at a bottom below the conveyor so as to define at least one bottom opening in the central portion of the trailer frame such the conveyor is substantially uncovered from the bottom of the central portion of the trailer frame; and
   a liftable and lowerable suspension arrangement operably coupled between the trailer frame and the wheel and axle assembly to raise and lower the trailer frame relative to the wheel and axle assembly;
   the liftable and lowerable suspension arrangement being operable to position the wheel and axle assembly in a transport position in which the trailer frame is raised relative to the wheel and axle assembly with the bottom of the central portion of the trailer frame spaced at a height above bottoms of wheels of the wheel and axle assembly so as to be suited for towing across the support surface;
   the liftable and lowerable suspension arrangement being operable to position the wheel and axle assembly in an operating position in which the trailer frame is lowered relative to the wheel and axle assembly so the bottom of the central portion of the trailer frame is disposed in substantially a common plane with the bottoms of the wheels so that in the operating position a portion of the trailer frame defining said at least one bottom opening in the central portion of the frame is disposed in contact with the support surface therebeneath to substantially form a seal therewith to restrict the dust emanating below the conveyor generated during transfer of the particulate material therealong.

18. The portable conveying apparatus of claim 17 wherein the housing spans from the first side of the trailer frame, above the conveyor, and transversely across the trailer frame, to the second side of the trailer frame.

19. The portable conveying apparatus of claim 17 wherein there is provided a dust containment wall on an underside of the trailer frame spanning between the first and second sides and from the bottom of the trailer frame towards an underside of the conveyor for contacting the support surface in the operating position of the wheel and axle assembly.

* * * * *